US008761271B2

(12) United States Patent  (10) Patent No.: US 8,761,271 B2
Spencer  (45) Date of Patent: Jun. 24, 2014

(54) SIMULTANEOUS DETECTION OF COMMUNICATIONS SIGNALS ON ALL PHASES OF A MULTI-PHASE POWER DISTRIBUTION NETWORK

(75) Inventor: Quentin Spencer, Champaign, IL (US)

(73) Assignee: Aclara Technologies LLC, St. Louis, MO (US)

( * ) Notice: Subject to any disclaimer, the term of this patent is extended or adjusted under 35 U.S.C. 154(b) by 183 days.

(21) Appl. No.: 13/407,265

(22) Filed: Feb. 28, 2012

(65) Prior Publication Data

US 2012/0219075 A1  Aug. 30, 2012

Related U.S. Application Data

(60) Provisional application No. 61/447,365, filed on Feb. 28, 2011.

(51) Int. Cl.
*H04B 3/00* (2006.01)

(52) U.S. Cl.
USPC ........... 375/257; 375/258; 375/316; 375/224; 375/219

(58) Field of Classification Search
USPC ..................... 375/258, 257, 316, 224, 219; 340/310.02–310.06
See application file for complete search history.

(56) References Cited

U.S. PATENT DOCUMENTS

| | | | | | |
|---|---|---|---|---|---|
| 4,963,853 | A | * | 10/1990 | Mak | 370/464 |
| 5,198,796 | A | * | 3/1993 | Hessling, Jr. | 375/340 |
| 8,483,313 | B2 | * | 7/2013 | Yonge et al. | 375/296 |
| 8,542,720 | B2 | * | 9/2013 | Spencer et al. | 375/219 |
| 2004/0222698 | A1 | * | 11/2004 | Hammond et al. | 307/3 |
| 2005/0129097 | A1 | * | 6/2005 | Strumpf et al. | 375/219 |
| 2010/0124288 | A1 | * | 5/2010 | Spencer et al. | 375/257 |
| 2010/0124289 | A1 | * | 5/2010 | Yonge et al. | 375/257 |
| 2010/0164473 | A1 | * | 7/2010 | Caird | 324/66 |

FOREIGN PATENT DOCUMENTS

KR  20020006773 A  1/2002

OTHER PUBLICATIONS

International Search Report for PCT application PCT/US2012/026951 mailed Sep. 26, 2012.
Written Opinion of the International Search Authority for PCT application PCT/US2012/026951 mailed Sep. 26, 2012.

* cited by examiner

*Primary Examiner* — Kenneth Lam
(74) *Attorney, Agent, or Firm* — Polster, Lieder, Woodruff & Lucchesi, L.C.

(57) ABSTRACT

A method of detecting a signal transmitted over one phase of a multi-phase power distribution system, components of the signal concurrently appearing on all phases of the system. The method includes detecting the components of each signal appearing on each phase, including neutral, of the system. Detected signals are provided to a signal processor which processes them to produce a detected signal which is a composite of all the components. The signals are combined by a weighted summation scheme that takes into account signal and noise correlation properties to simultaneously maximize signal strength and suppress noise. If other signals are present on other phases of the system, any resulting interference is canceled out from the detected signal to further improve the quality of the detected signal.

10 Claims, 4 Drawing Sheets

SIMULTANEOUS DETECTION OF COMMUNICATIONS SIGNALS ON ALL PHASES OF A MULTI-PHASE POWER DISTRIBUTION NETWORK

CROSS REFERENCE TO RELATED APPLICATIONS

U.S. provisional application No. 61/447,365 filed Feb. 28, 2011.

STATEMENT REGARDING FEDERALLY SPONSORED RESEARCH OR DEVELOPMENT

N/A

BACKGROUND OF THE INVENTION

This invention relates to communications over a power distribution network to, for example, supply electricity from a utility to consumers. More particularly, the invention is directed to the simultaneous detection of communications signals, specifically those sent from consumer facilities back to the utility, on all phases of the utility's power distribution network.

Communications systems employed by electrical utilities are known in the art. See for example, U.S. Pat. Nos. 6,940,396 and 5,262,755. Typically, the utility uses the system to send messages or commands (outbound signals) from a transmitter location (usually at a network substation) to consumer facilities. A transceiver which is typically incorporated in meters at the respective facilities, in response to the execution of a command or a request for information, then sends a signal (an inbound signal) back to the utility.

Previously, equipment located at the utility for receiving incoming messages did not have the capability to simultaneously receive messages on multiple phases of the network. Now, however, the receivers do have this capability; and, since there is usually a part of the inbound signal present on all three phases of the network, combining the signals on all the phases can yield optimal signal strength.

One communications system used by utilities is a two-way automatic communications systems, or TWACS®. In earlier implementations of this system, inbound signal detection hardware only had the capability to sample a signal on one phase at a time. Current signal detection hardware now has the capability to sample signals on all inputs (phases) to a substation simultaneously. A method for detection of signals transmitted simultaneously on multiple phases is disclosed in U.S. Pat. No. 6,940,396, but that method is designed for detecting signals on one phase at a time and relies on temporal differences between signals to separate them. Depending upon the wiring configuration, all inbound signals appear on at least two of the three phases (or four phases if a neutral phase is present) available at the substation, and optimal detection of inbound signals should therefore include signals from these multiple phases. Heretofore, however, that has not been possible. Using the method of the invention for performing "all-phase" detection, and which operates in a concurrent phase mode, it now is.

In addition to all-phase detection producing a higher signal strength signal, optimizing the signal-to-noise ratio (SNR) of a combined signal also requires that the detection method take into account correlation, if present, in the noise signals on the various phases. In accordance with the method of the invention, the signal strength and noise correlations are estimated adaptively for each inbound signal and the resulting combining scheme should produce higher signal-to-noise ratios.

Finally, previous implementations of concurrent-phase methods were complex, requiring separate signal-processing algorithms for detection and for canceling interference from signals on other phases. The method of the present invention integrates these algorithms, with the resulting single algorithm simultaneously producing better communication performance and reduced computational requirements relative to previous algorithms.

BRIEF SUMMARY OF THE INVENTION

The present invention is directed to an all-phase detector and detection method for use in a communications system for a utility's power distribution network. The detector and method detect the signal present on all three (or four) phases of the network, and combines the results from all phases to produce a signal having a higher signal strength than any of the individual signals. The detector and method further have the effect of suppressing noise whose statistics are uncorrelated across more than one of the phases. The algorithm finds optimal weights for summing the signals such that signal power is increased and noise is suppressed to the extent possible to maximize the signal-to-noise ratio.

The method of the invention utilizes a concurrent-phase algorithm which integrates the previously separate signal-processing algorithms for signal detection and for cancellation of interference from signals on other phases. This integration results in a less complex and more reliable detector design. Further, all additional signals present on the neutral conductor are used in the algorithm of the present invention thereby eliminating the previous practice of having to retry missed communications on the neutral conductor.

The detector is readily implemented in current utility communications systems such as TWACS so as to provide better communications between the utility and its customers with respect to inbound signals sent from a customer's site to a utility substation.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
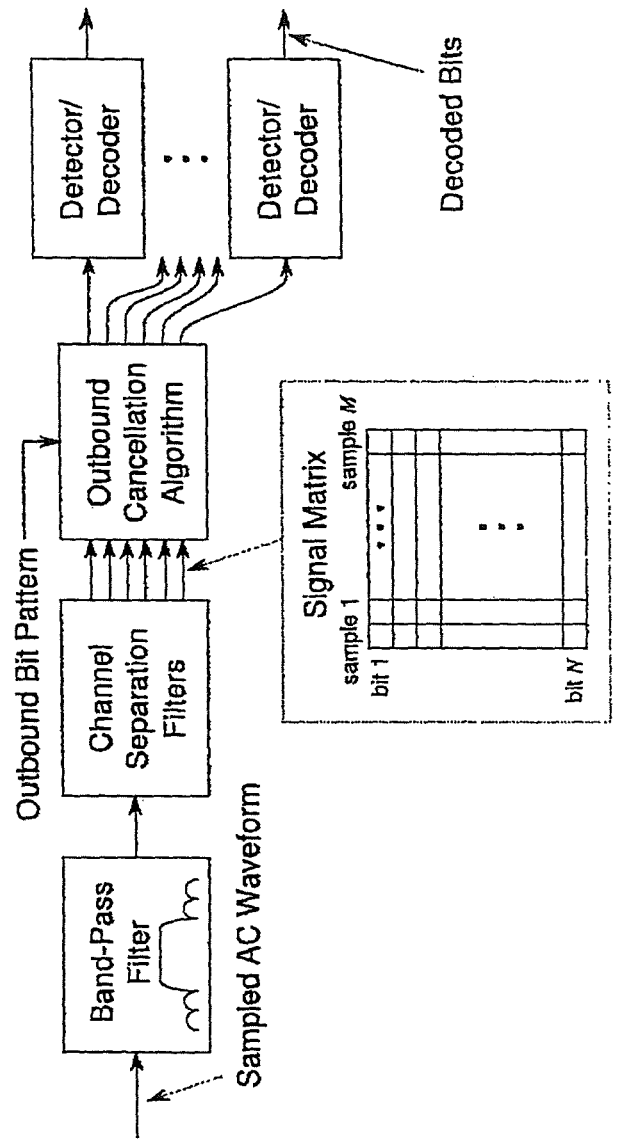
FIG. 1 is a simplified block diagram of a data processing stream for single-phase signal detection.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, a conventional sequence of events in the signal processing for single-phase detection is illustrated. With respect to FIG. 1, a sampled current waveform is first processed with a band-pass filter to reduce noise occurring at frequencies having little signal power. Next, the filtered waveform is passed through a channel separation filter (such as that shown in U.S. Pat. No. 5,262,755 which is owned by the same assignee as the current application). This filter includes one filter for each channel and is used to process the signal and to isolate the summed pulse shape for each bit from the combined signal. Accordingly, for each channel, a set of waveforms for each bit is produced. These are now arranged in a signal matrix of size M×N, where M is the number of samples per half-cycle and N is the number of bits. For example, the number of samples per half-cycle would be 36 for a 60 Hz AC waveform sampled at the rate of 4320 samples per second, but can be fewer if down sampling is done or a different sample rate is used. Signals for all six channels then pass through an outbound signal cancellation algorithm. The concurrent phase mode described in previously referred to U.S. Pat. No. 6,940,396 and currently used in TWACS systems has outbound transmissions on the phase simultaneous with inbound signals on other phases. Because the outbound signals leak onto the other phases and are quite strong due to being generated locally, removal of the outbound signal is necessary in order to reliably detect the inbound signals. This algorithm uses the outbound bit pattern, which is known to the detector due to its being generated locally to separate or "clean" the outbound signal from the inbound signal. In cases when no interfering outbound signal is present, the algorithm simply passes the signal through. After this interference cancellation, the resulting signal matrix for each channel is sent to the detector and decoder for the extraction of decoded bits.

Figure 2:
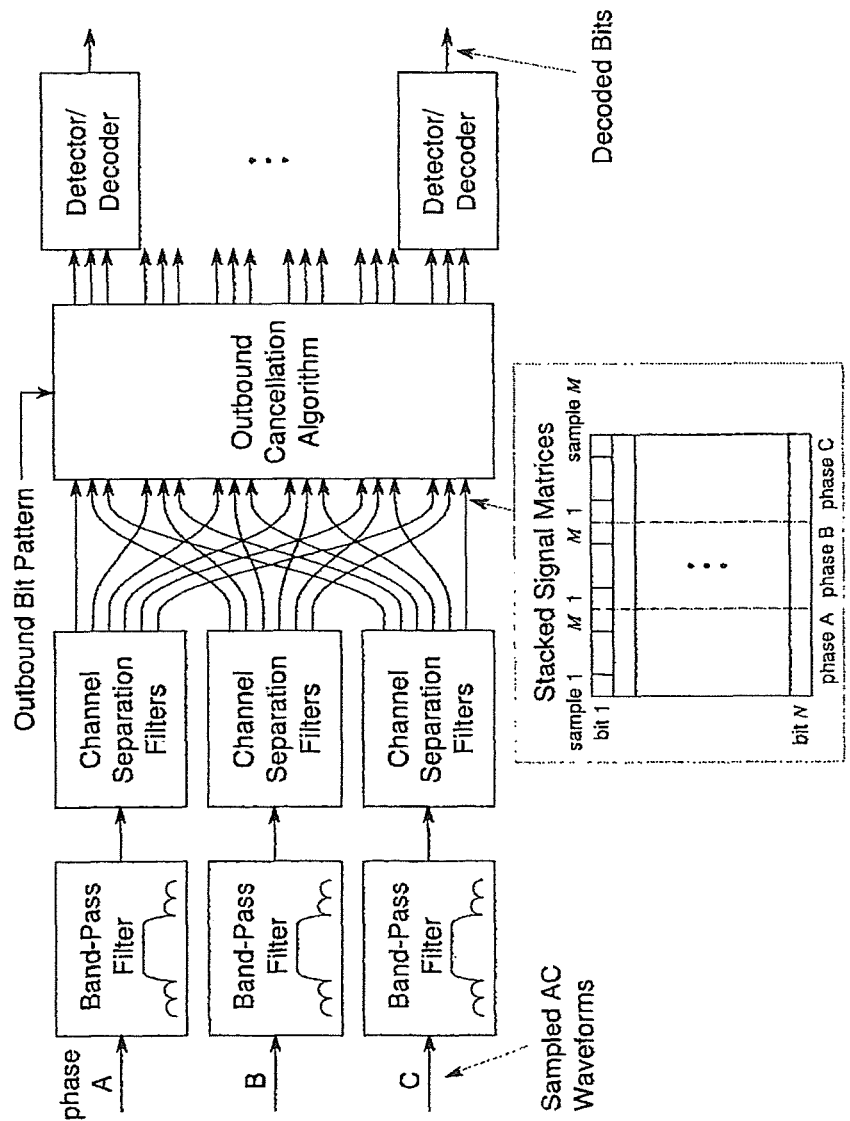
FIG. 2 is a simplified block diagram of a data processing stream for all-phase signal detection.

Referring to FIG. 2, a data processing scheme for all-phase detection is shown. In FIG. 2, the same sequence of steps is performed as is shown in FIG. 1; except that now, however, band-pass filtering and channel separation operations are performed on all three phases A, B, and C of the power distribution network. Further, after the channel separation step, the signals from all three phases are combined to create a single "stacked matrix" for each particular channel. The outbound cancellation algorithm is then applied to the stacked signal matrices, and these are then passed to the detector and decoder. With signals for each bit being one half-cycle in length, this amounts to 36 samples using the system parameters described earlier. It will be appreciated by those skilled in the art that depending on the cutoff frequency of the band-pass filter it is possible to downsample the filtered signals by a factor of 2 or 3 without losing any information contained in the signal. By implementing such downsampling, it is possible to keep the data size and computational cost similar to that of a single-phase inbound detector without downsampling, so it can readily be implemented on similar hardware.

While the block diagram of FIG. 2 shows phases A, B, and C, the neutral phase is also included, if it is present. In many present installations, it is common to generate an analog "synthetic" neutral by summing all three phases. When this is done, the synthetic neutral signal will not necessarily provide any new information when processed using the all-phase detection method of FIG. 2. This is because the signal does not include a different "copy" of the inbound waveform. However, in installations where an actual bus-level neutral is present, the neutral signal does contain additional inbound signal information not available by summing all of the remaining phases when processing a phase-to-neutral signal. It will be understood by those skilled in the art that noise levels are usually higher at the bus level than at the feeder level. Accordingly, it had previously been thought that a feeder level "synthetic" neutral was preferable to a real bus-level neutral signal. However, for all-phase detection in accordance with the present invention, there is a benefit in having a bus level signal, and the need for this can be empirically determined at a given location after the all-phase detection algorithm is implemented and communication performance is assessed.

The all-phase detection algorithm of the present invention has two significant benefits for a power line communications system. First, is improved performance which is achieved by combining all of the signal sources so to increase the ratio of the detected signal to the noise present on the respective phases. Second, is an improved, simpler system design for concurrent phase detection.

Previous methods of concurrent phase detection required additional inputs besides those required for the signal matrix; this being done in order to cancel out interfering signals from other phases, and because the system needed to retain information about the waveforms and detected bits from the other phases. It will be understood that this becomes particularly complicated because signals are not always temporally aligned across all phases. Thus, any inbound signal in a particular channel may be subject to interference from up to four other inbound signals; i.e., two signals each from each of the other phases. From a data management viewpoint, it is particularly advantageous to have a detection algorithm that utilizes a signal matrix from all phases for a particular inbound signal time slot and channel, and then detects the signal in a robust way without the need of the other inputs noted above. The detection algorithm of the present invention does this.

With regard to TWACS referred to above, in the past, signal detection algorithms used temporal windowing of an inbound signal. In addition, even though there was a full half-cycle worth of samples available for signal detection, the width of the current pulse was much less than the full signal window. This resulted in the discarding of some samples at the beginning and end of a detection window. This improved the signal-to-noise ratio by removing samples that had relatively little signal strength, but which contained noise. When the system was operating in a concurrent phase mode, it was also common to have signals from other phases present at the beginning and end of a detection window as well. During concurrent phase detection, it then became necessary to narrow the detection window so to minimize the interference from the other inbound signals. For all-phase detection, in accordance with the present invention, a narrow detection window continues to be used; but now, samples obtained before and after the detection window are also used for estimation of interference.

Figure 3:
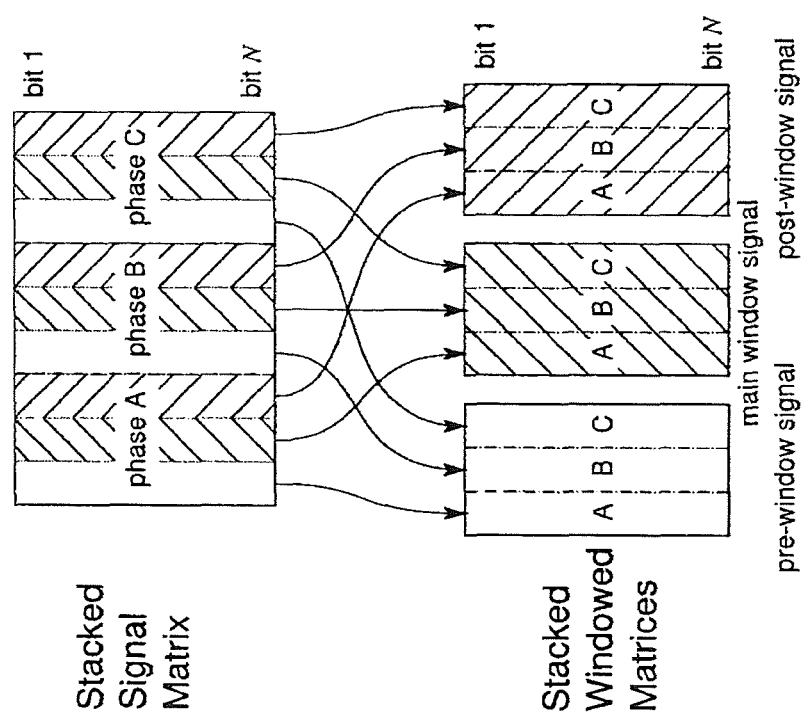
FIG. 3 is a representation of a windowing scheme used for all-phase signal detection; and, FIG. 4 is a graph representing a performance comparison of an all-phase detector and method of the present invention in a concurrent phase mode with the single phase in both single and concurrent phase modes.

Referring now to FIG. 3, a signal windowing scheme used with the present invention is illustrated. In FIG. 3, an external input to the detection algorithm comprises the stacked signal matrix shown on the left side of the Fig. As denoted in the Fig., this stacked window matrix represents all three phases A, B, and C. Within each phase are three temporal regions representing the main detection window and regions before and after the main window.

A first step in all-phase detection is to rearrange the single stacked signal matrix into three stacked signal matrices representing each of the three windows. This is as shown on the right side portion of FIG. 3 where the three stacked and windowed matrices are respectively labeled "main window", "pre-window", and "post-window" signals. In the mathematical descriptions that follow, these three signal matrices are denoted as $S_{main}$, $S_{pre}$ and $S_{post}$. Theoretically, these three matrices do not need to have the same number of columns. However, in simulation tests, reasonably good results were obtained by having them equal. Therefore, for simplicity in the following description, it is assumed that the respective windows are dimensionally equal. This implies that for M samples per phase, each of the windows is M/3 samples wide, and that the three stacked and windowed matrices are of a size M×N, or 4M/3×N if a neutral signal is present.

In prior detection schemes, pre-window and post-window samples were discarded, with only the $S_{main}$ samples then being used to detect inbound messages. In the all-phase detection method of the present invention, the multi-phase stacked version of the $S_{main}$ samples is again used as the most significant component in the signal detection scheme. It is further noted that, in the single phase detection method, a singular value decomposition was used to create a low-rank approximation of the main window signal matrix in order to separate signal and noise. For all-phase detection, the rank of the approximation is increased from 3 to 5, this being based on empirical results. This increase is also helpful because the stacked matrix is significantly larger and contains more signal information than does a single phase signal matrix. The decoding procedure is, in some respects, similar to a maximum SNR decoding method. That method includes the steps of: a) estimating bits using a correlation detector and a low-rank approximation of a data matrix; and b) refinement of the bit estimate using low-rank approximated data. For all-phase detection, similar steps are used, but with adjustments being made as to the rank and size of the data matrix. The primary difference is in creating an initial estimate of the bits.

For all-phase mode detection, estimation of bits is complicated by the presence of interference signals. Because these interference signals do not necessarily align with message boundaries, it is very difficult to decode actual message bits so as to estimate interference. However, a reasonable first order estimate of interfering messages is obtained by computing singular value decompositions and using the dominant, left singular vectors of the pre-window and post-window signal matrices which are respectively defined as $U_{pre}$ and $U_{post}$. This then means that we need to compute left singular vectors for all three of the S matrices $S_{main}$, $S_{pre}$ and $S_{post}$. Because the operation has a complexity proportional to $M^3$, it is faster to compute decompositions of three small S matrices rather than one large one. This makes the computational load of the computer programmed to perform all-phase detection more manageable. With the two interference estimates, their respective contributions are removed from $S_{main}$ using a null-space projection procedure similar to that used for cleaning outbound interference. This results in a "cleaned" version of the signal which is defined as $S_{clean}$.

A challenge to this procedure is that, at this stage, applying a correlation detector to $S_{main}$ sometimes yields better initial estimates of the bits than $S_{clean}$. This is primarily the result of the relative strength and timing of the interference in the communications system. In the single phase mode, no interference is expected in $S_{pre}$ and $S_{post}$, for example, and $S_{main}$ is the preferred choice. Since the detection algorithm by itself does not know whether the system is operating in the single phase mode, in order to avoid requiring any additional inputs to the detection algorithm, the solution, at this point, is to apply the correlation detector to both the original and cleaned signal matrices; and then to use the estimated bits from the matrices with the highest signal-to-noise ratio. Simulations have shown this approach to be successful.

Once the bits are estimated, the method of the invention utilizes a low-rank approximation of $S_{main}$ to refine the estimate and produce the final result.

The steps in performing the method of the invention are as follows:

1. Create three stacked windowed matrices (See FIG. 3); $S_{main}$, $S_{pre}$, $S_{post}$.

2. For each matrix, compute a left singular vector, extracting $U_k$, the K dominant vector of $S_{main}$, and $U_{pre}$ and $U_{post}$, the respective dominant vectors of $S_{pre}$ and $S_{post}$.

(a) Compute W, the eigenvectors of $S^T S$, and λ, the corresponding eigenvalues.

(b) Let $W_k$ represent the K columns of W corresponding to the k largest eigenvalues.

(c) Compute $U_k$:

$$U_k = S W_K \Lambda_k^{-1/2}$$

where $\Lambda_k$ is a diagonal matrix containing the first K elements of λ on its diagonal. The normalization of $\Lambda_k$ is not necessary if only one vector is used, as is done with $S_{pre}$ and $S_{post}$.

3. Create $S_{clean}$, a copy of $S_{main}$ with the most significant contributions from the pre and post window signals removed.

$$V = [U_{pre} U_{post}]$$

$$S_{clean} = S_{main} - V(V^T V)^{-1} V^T S_{main}$$

4. Using $S_{clean}$ and $S_{main}$, use an SNR weighted correlation detector to choose a best estimate for the message bits.

(a) For each of the S matrices, compute d, the output of the correlation detector.

(i) Let $S_C$ represent the rows of S corresponding to the known header bits in the message. The diagonal matrix C contains the values of the bits represented as ±1.

(ii) Compute the correlation vector C:

$$T = S_C^T C$$

$$\mu_i = \frac{1}{M} \sum_{i=1}^{M} t_{i,j}$$

$$C_i = \frac{\mu_i}{\sum_{i=1}^{M} (t_{i,j} - \mu_i)^2}$$

(iii) Use the correlation vector to estimate the bits:

$$d = Sc$$

(b) Of $d_{main}$ and $d_{clean}$, let $d_{max}$ be the vector with the highest estimated SNR, which can be computed by finding the vector with the largest value of $$\frac{\left(\sum_{n=1}^{N}|d_n|\right)^2}{\sum_{n=1}^{N}d_n^2}$$

(c) Use the sign of $d_{max}$ as the estimated bits:

$$b_0 = \text{sgn}(d_{max})$$

5. Refines the estimate of the bits and use it to compute the soft-decision outputs:
(a) compute the vector p and $$p = b_0 \otimes (U_K(U_K^T b_0))$$

$$q = (U_K(U_K \otimes U_K))1$$

(b) compute $b_1$ from $b_0$. For all j=

$$b_{i,j} = \begin{cases} b_{0,j} & p_j \geq q_j \\ -b_{0,j} & p_j < q_j \end{cases}$$

Or in other words, flip the bits of all cases where $p_j < q_j$.
(c) From $b_1$, compute the detector output:

$$d = U_K(U_K^T b_1).$$

6. Let $b_0 = \text{sgn}(d)$ and repeat step 5.

Figure 4:
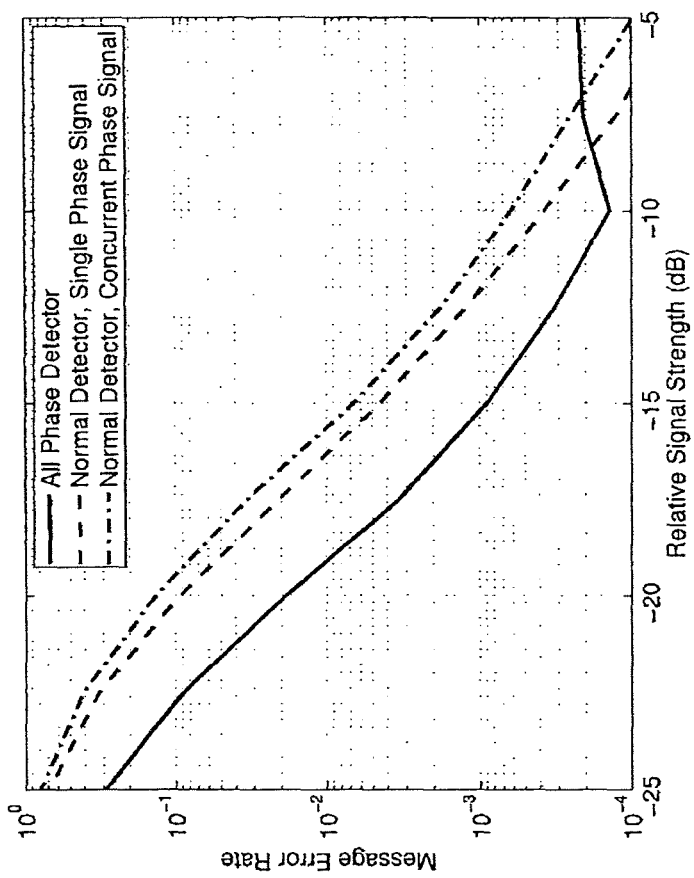

Finally, FIG. 4 presents a comparison of the simulated performance of the all-phase detection algorithm of the present invention with two other detection schemes. The first scheme of the other schemes is for single-phase signal detection and involves an existing maximum SNR detection algorithm. The other scheme is for concurrent-phase detection and is based on line-to-line signaling. As shown in FIG. 4, the concurrent-phase detection algorithm exhibits a slight loss in performance, relative to the single-phase detection algorithm, as a result of increased interference present in the signal. The all-phase detection algorithm achieves nearly a 2 dB gain in performance relative to the single-phase signaling detection; and slightly more than a 2 dB gain relative to concurrent-phase signaling detection. An exception to this gain in performance is at high SNR where a noise floor exists in the all-phase detection performance. However, since the floor is at a block error rate of less than $10^{-3}$, it should not cause significant problems for all-phase inbound signal detection.

In view of the foregoing, it will be seen that the several objects and advantages of the present invention have been achieved and other advantageous results have been obtained.

Having thus described the invention, what is claimed and desired to be secured by Letters Patent is:

1. A method of detecting a signal transmitted over at least one phase of a multi-phase power distribution system, components of the signal concurrently appearing on multiple phases, including neutral, of the system, comprising:
   detecting, with a signal detector, incoming signals on all phases, including neutral, of the system;
   providing the detected signals from each phase to a signal processor; and,
   processing the detected signals using the signal processor, including combining all components of each signal appearing on each phase, including neutral, to produce a composite signal having a greater signal strength than would have been observable on any individual phase of the power distribution system.

2. The method of claim 1 in which, if other signals are present on other phases of the system, any resulting interference from these other signals with the detected signal is cancelled out from the detected signal thereby to improve the quality of the detected signal.

3. The method of claim 1 in which the signal processor employs a concurrent phase algorithm for signal detection.

4. The method of claim 3 in which the concurrent phase algorithm is an integration of separate signal-processing algorithms for each phase of the distribution system.

5. The method of claim 1 in which the signal detector for each phase includes a band-pass filter and a channel separation filter.

6. The method of claim 5 in which the signal processor obtains samples of the filtered detected signal on each phase of the distribution system and forms a single stacked signal matrix containing the signals from each respective phase using the samples.

7. The method of claim 6 in which each stacked signal matrix includes signal samples from three temporal regions, a main window signal section representing a main detection window, a pre-window signal section representing the temporal region before the main section, and a post-window signal section representing the temporal region after the main section.

8. The method of claim 7 further including forming the stacked signal matrix into three stacked windowed matrices by assembling the main, pre, and post-window portions of the signal from each phase into a separate stacked matrix.

9. The method of claim 8 in which each stacked windowed matrix has the same dimensions as each of the other stacked windowed matrices.

10. The method of claim 8 in which processing the stacked windowed matrices includes the steps of:
    estimating initial bit values using a correlation detector;
    performing an approximation of each data matrix; and
    refining each bit estimate using approximated data.

* * * * *